United States Patent
Liu et al.

(10) Patent No.: US 8,824,759 B2
(45) Date of Patent: Sep. 2, 2014

(54) CORRECTING AXIAL TILT BASED ON OBJECT POSITIONS IN AXIAL SLICES OF THREE DIMENSIONAL IMAGE

(75) Inventors: Tong Liu, Singapore (SG); Jian Xu, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 1220 days.

(21) Appl. No.: 12/394,735

(22) Filed: Feb. 27, 2009

(65) Prior Publication Data

US 2009/0214135 A1   Aug. 27, 2009

Related U.S. Application Data

(60) Provisional application No. 61/064,315, filed on Feb. 27, 2008.

(51) Int. Cl.
  G06K 9/62    (2006.01)
  G06T 19/00   (2011.01)
  G06T 11/00   (2006.01)

(52) U.S. Cl.
  CPC ......... *G06T 11/008* (2013.01); *G06T 2219/008* (2013.01); *G06T 19/00* (2013.01); *G06T 2219/2016* (2013.01)
  USPC ............................ 382/131; 382/154; 345/424

(58) Field of Classification Search
  None
  See application file for complete search history.

(56) References Cited

U.S. PATENT DOCUMENTS

| | | | | |
|---|---|---|---|---|
| 5,371,778 A | * | 12/1994 | Yanof et al. | 378/4 |
| 6,122,341 A | * | 9/2000 | Butler et al. | 378/20 |
| 6,745,066 B1 | * | 6/2004 | Lin et al. | 600/425 |
| 2008/0013815 A1 | * | 1/2008 | Scorcioni et al. | 382/131 |
| 2008/0123923 A1 | * | 5/2008 | Gielen et al. | 382/131 |
| 2008/0139912 A1 | * | 6/2008 | Lee et al. | 600/382 |

FOREIGN PATENT DOCUMENTS

WO    2008130325 A1    10/2008

* cited by examiner

*Primary Examiner* — Jason M Repko
*Assistant Examiner* — David Perlman
(74) *Attorney, Agent, or Firm* — Dinsmore & Shohl LLP

(57) ABSTRACT

A computer-implemented process is provided for reorienting a three-dimensional (3D) scan image of an object. The object has a generally flat surface. The image is constructed from image data obtained during rotation of the object about a rotation axis, which intersects the plane of the flat surface at an angle. Axial slices of the scan image are obtained, each of which represents a slice of the object that is perpendicular to the rotation axis and comprises a line representing the flat surface of the object. The axial slices are shifted to align lines representing the flat surface in different axial slices, thus forming a reoriented 3D image. Alternatively, an axial tilt angle is determined from the positions of these lines and the image is rotated by the determined angle to form a reoriented 3D image.

27 Claims, 14 Drawing Sheets

CORRECTING AXIAL TILT BASED ON OBJECT POSITIONS IN AXIAL SLICES OF THREE DIMENSIONAL IMAGE

This application claims the benefit of U.S. provisional application No. 61/064,315, filed Feb. 27, 2008, the entire contents of which are incorporated herein by reference.

The present invention relates generally to imaging processing, and particularly to reorienting three-dimensional (3D) images of planar objects.

Three-dimensional scanned images of planar objects are useful for various applications, such as in the electronics industry. For example, X-ray computed tomography (CT) images can be used to inspect internal defects in a planar object, including multi-layered electronics device such as Low Temperature Co-Fired Ceramics (LTCC) or stacked IC chips. In a typical CT imaging process of a 3D planar object, the object is scanned when it is rotated about a rotation axis. The start angle of rotation may be determined based on a sonogram of the scan data. The CT image volume of the object is then constructed based on the identified start angle. The reconstructed CT volume of the object may be dissected into separate layers. It is desirable that these layers are parallel to a reference plane in the reconstruction volume. However, it is difficult to do so due to misalignment in conventional techniques.

The orientation of the object layers in the reconstruction volume may be tilted with respect to the reference plane if there is an offset between the actual start angle of rotation and the default start angle assumed in the reconstruction process. The default start angle is often assumed to be zero or 90 degrees with respect to the plane of the detector. The actual start angle, however, is often different from zero or 90 degrees. The start angle offset may be corrected by determining the actual start angle, using the actual start angle to reconstruct the CT volume.

The orientation of the object layers in the reconstruction volume may also be tilted with respect to the reference plane if the surface plane of the planar objection is not parallel to the rotation axis (referred to herein as axial tilt). That is, the object surface plane is tilted at an angle relative to the rotation axis. Axial tilt often occurs as it is difficult to mount the planar object onto a rotation axis so that the object plane and the rotation axis are perfectly parallel to each other. Axial tilt can also arise, for example, if an internal object surface plane is not parallel to an external surface plane of a packaging that encloses the internal object. Conventionally, correction of axial tilt during the visualization process involves manual manipulation of the CT images to align the object image with a reference axis or plane. Manual correction of axial tilt is a slow process and its accuracy depends on the experience and subjective judgment of the user.

An automated process is thus provided herein for automatically reorienting a scan image to correct for axial tilt. As this process can be automated, it can be quickly performed with consistent and reliable results, and CT images can be automatically reoriented in a reference coordinate frame (reconstruction volume) with the dissected layers parallel to a reference plane.

Thus, in accordance with an aspect of the present invention, there is provided a computer-implemented process of reorienting a three-dimensional (3D) scan image of an object, the object having a generally flat surface, the image being constructed from image data obtained during rotation of the object about a rotation axis, the rotation axis intersecting the plane of the flat surface at an angle, the process comprising: obtaining axial slices of the scan image, each representing a slice of the object that is perpendicular to the rotation axis and comprising a line representing the flat surface of the object; shifting the axial slices to align lines representing the flat surface in different axial slices, thus forming a reoriented 3D image; and presenting a representation of the reoriented 3D image to a user.

In accordance with another aspect of the present invention, there is provided a computer comprising a processor and a memory readable by the processor, the memory storing thereon computer executable code for reorienting a three-dimensional (3D) scan image of an object, the object having a generally flat surface, the image being constructed from image data obtained during rotation of the object about a rotation axis, the rotation axis intersecting the plane of the flat surface at an angle, the code when executed by the processor causes the computer to obtain axial slices of the scan image, each representing a slice of the object that is perpendicular to the rotation axis and comprising a line representing the flat surface of the object; shift the axial slices to align lines representing the flat surface in different axial slices, thus forming a reoriented 3D image; and present a representation of the reoriented 3D image to a user.

In the above process or computer, the positions of the object lines in different axial slices may be determined based on distribution of line intensities in the axial slices. The angle may be calculated in a procedure comprising fitting the positions of the lines to a linear line and calculating an angle between the linear line and the rotation axis. The positions of the lines may be determined from peak positions in line intensity distribution curves for respective axial slices. The peak position of a peak may be the position of an edge of the peak, or the center of the peak. The scan image may be initially registered in a Cartesian coordinate system such that a first coordinate axis is parallel to the rotation axis and a second coordinate axis is parallel to the flat surface. The shifting may comprise shifting the slices in a direction parallel to a third coordinate axis such that the lines representing the flat surface are equal distance to the first coordinate axis after the shifting. The scan image may be a computed tomography image. The presenting may comprise storing the reoriented image in a computer readable medium. The may comprise presenting a visual depiction of the reoriented image. The visual depiction may comprise a depiction of a layer of the reoriented image, the layer being perpendicular to the axial slices.

In accordance with a further aspect of the present invention, there is provided a computer-implemented process of reorienting a three-dimensional (3D) scan image of an object, the object having a generally flat surface, the image being constructed from image data obtained during rotation of the object about a rotation axis, the rotation axis intersecting the plane of the flat surface at an angle, the process comprising obtaining axial slices of the scan image, each representing a slice of the object that is perpendicular to the rotation axis and comprising a line representing the flat surface of the object; determining the angle from positions of lines representing the flat surface in different axial slices; rotating the scan image by the angle to form a reoriented 3D image, thus aligning lines representing the flat surface in different axial slices in the reoriented 3D image; and presenting a representation of the reoriented 3D image to a user. The positions of the lines in different axial slices may be determined based on distribution of line intensities in the axial slices. The determining may comprise calculating the angle, the calculating comprising fitting the positions of the lines to a linear line and calculating an angle between the linear line and the rotation axis. The positions of the lines may be determined from peak positions in line intensity distribution curves for respective axial slices. The rotating the scan image may comprise rotating slices of the scan image that are perpendicular to the axial slices and parallel to the rotation axis.

In accordance with another aspect of the present invention, there is provided a computer comprising a processor and a memory readable by the processor, the memory storing thereon computer executable code for reorienting a three-dimensional (3D) scan image of an object, the object having a generally flat surface, the image being constructed from image data obtained during rotation of the object about a rotation axis, the rotation axis intersecting the plane of the flat surface at an angle, the code when executed by the processor causes the computer to obtain axial slices of the scan image, each representing a slice of the object that is perpendicular to the rotation axis and comprising a line representing the flat surface of the object; determine the angle from positions of lines representing the flat surface in different axial slices; rotate the scan image by the angle to form a reoriented 3D image, thus aligning lines representing the flat surface in different axial slices in the reoriented 3D image; and present a representation of the reoriented 3D image to a user.

In accordance with a further aspect of the present invention, there is provided a computer readable medium storing thereon computer executable code, the code when executed by a computer causing the computer to perform a process described herein.

Other aspects and features of the present invention will become apparent to those of ordinary skill in the art upon review of the following description of specific embodiments of the invention in conjunction with the accompanying figures.

In the figures, which illustrate, by way of example only, embodiments of the present invention, FIG. 1 is a block diagram of a computer, exemplary of the an embodiment of the present invention;

Figure 1:
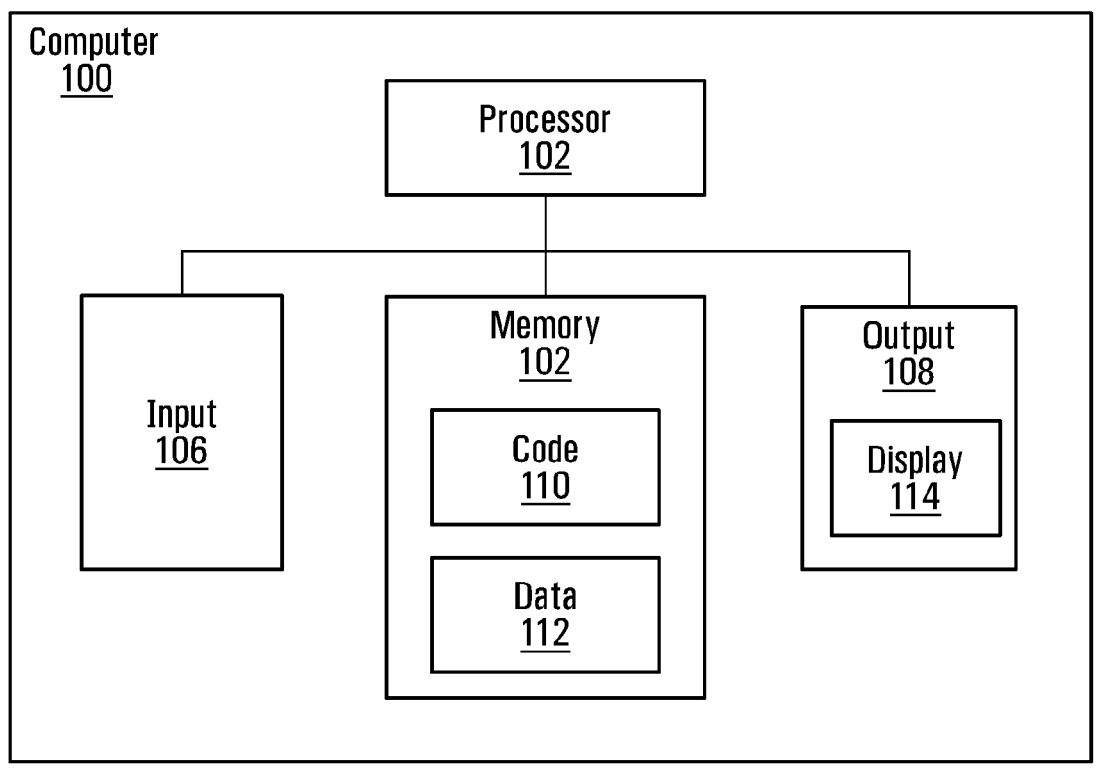

Exemplary embodiments of the present invention include automated processes of scan image reorientation. In an exemplary process, a three-dimensional (3D) scan image of a planar object is reoriented. A planar object is an object that has a generally flat surface. The flat surface may include patterns on it. The planar object may have two generally flat surfaces that are generally parallel to each other. The scan image is reconstructed from image data obtained during rotation of the object about a rotation axis, such as in a computed tomography (CT) imaging process where the rotation axis is generally parallel to the detector surface (plane). For example, a 3D scan image may be formed by reconstructing a series of image slices that are oriented perpendicular to a reference axis. The reference axis represents the rotation axis or a line that is parallel to the rotation axis, and these image slices are referred to herein as axial slices. It is assumed that the rotation axis intersects the plane of the flat surface at an angle due to, for example, imperfect mounting of the planar object. Each axial slice represents a slice of the planar object that is perpendicular to the rotation axis. Each axial slice also includes a line (or lines) representing the flat surface(s) of the object, which are referred to herein as object lines. The positions (heights) of the corresponding object lines in the axial slices are determined. Optionally, a tilt angle (the angle between the object plane and the rotation axis) may be calculated based on the object line positions. The scan image is then reoriented to align the object lines to form a reoriented image. The reorientation may be performed by shifting the axial slices perpendicular to the reference axis, or by rotating the scan image (e.g. its frontal slices which are perpendicular to the axial slices and the detector plane) based on the tilt angle. The un-rotated frontal slices may be formed based on the axial slices. The sagittal slices may be rotated by an amount equivalent to the tilt angle to make the object line(s) in each sagittal slice parallel to the reference axis that represents the rotation axis. A representation of the reoriented image, such as a visual depiction of the reoriented image, may then be presented to a user for viewing or further processing. For example, a layer of the reoriented scan image may be presented for viewing or processing. This layer may be obtained by cutting the 3D scan image so that the layers are perpendicular to reference axis that is in the thickness direction of the object image.

A scan image may be represented by a matrix of voxels in a reference frame. The reference frame may be a Cartesian coordinate frame with a first coordinate axis parallel to the rotation axis and a second coordinate axis parallel to the detector surface. The voxels can be divided into a plurality of axial slice sets. Each axial slice set includes voxels representing a two-dimensional (2D) axial slice of the scan image. The axial slices are perpendicular to the first axis. Each axial slice includes a line that represents the flat surface in the slice. This line may be referred to as the object line of that axial slice.

The axial slices may be shifted in the direction that is parallel to a third coordinate axis so that the object lines in the shifted slices are equal-distance from the first coordinate axis. A new (re-oriented) 3D CT image may be formed with the shifted axial slices.

The voxels of the initial 3D image may also be divided into a plurality of sagittal slice sets, representing sagittal slices of the image. The sagittal slices are parallel to the plane formed by the first axis and the third axis. A tilt angle may be calculated based on the positions of the object lines in the axial slices. The sagittal slices may be rotated by the tilt angle about an axis that is normal to the sagittal slices. A new (re-oriented) 3D CT image may be formed with the rotated sagittal slices.

While both shifting and rotation may provide a better aligned reoriented image, more computing resources may be required to rotate a 3D image than to shift slices of the image. With shifting, a simple and fast axial tilt-correction process may be implemented.

As will be discussed in more detail below, the positions of the object lines may be determined based on distribution of line intensities in the slices, such as from peak positions of distribution curves of the line intensities for respective slices.

The exemplary processes disclosed herein are performed, at least in part, by a computing device such as computer 100 shown in FIG. 1, exemplary of embodiments of the present invention.

Computer 100 has a processor 102, which communicates with memory 104, input 106 and output 108. Computer 100 may optionally communicate with a network (not shown).

Processor 102 includes one or more processors for processing computer executable codes and data.

Memory 104 is an electronic storage comprising a computer readable medium for storing electronic data including computer executable codes 110 and image data 112. Memory 104 includes primary memory that is readily accessible by processor 102 at runtime and typically includes a random access memory (RAM). Primary memory can store data at runtime. Memory 104 may also include secondary memory, which may include persistent storage memory for storing data permanently, typically in the form of electronic files. Secondary memory may also be used for other purposes known to persons skilled in the art. A computer readable medium may be any available media accessible by a computer, either removable or non-removable, either volatile or non-volatile, including any magnetic storage, optical storage, or solid state storage devices, or any other medium which may embody the desired data including computer executable instructions and can be accessed, either locally or remotely, by a computer or computing device. Any combination of the above is also included in the scope of computer readable medium.

Input 106 may include one or more suitable input devices, and typically includes a keyboard and a mouse. It may also include a microphone, a scanner, a camera, and the like. It may also include a computer readable medium such as a removable memory and the corresponding device for accessing the medium. Input 106 may be used to receive input from the user, another device, or a network (not shown). An input device may be locally or remotely connected to processor 102, either physically or in terms of communication connection.

Output 108 may include one or more output devices, which may include a display device 114, such as a monitor. Suitable output devices may also include other devices such as a printer, a speaker, and the like, as well as a computer writable medium and the device for writing to the medium. Like an input device, an output device may be local or remote.

Computer 100 may communicate with other computer systems (not shown) on a network (not shown).

It will be understood by those of ordinary skill in the art that computer 100 may also include other components not shown in the figure.

Computer executable code 110 stored in memory 104, includes code that when executed by processor 102 causes computer 100 to carry out at least some portions of the methods described herein. For example, computer executable code 110 may include code for performing the process S200 illustrated in FIG. 2. As can be appreciated, methods described herein may also be carried out using a hardware device having circuits for performing one or more of the described calculations or functions. For example, one or more of the functions of the codes described herein may be performed by a computing circuit (not shown).

Data 112 may include both image data input and image data output, and other data used for processing the image data or data. For example, image data may be received through input 106. Output data may be stored on memory 104 before it is output through output 108.

Process S200 is a computer-implemented automated process for reorienting three-dimensional (3D) computed tomography (CT) scan images of planar objects to correct potential misalignment between the scan rotation axis and the object plane, exemplary of embodiments of the present invention.

Figure 3:
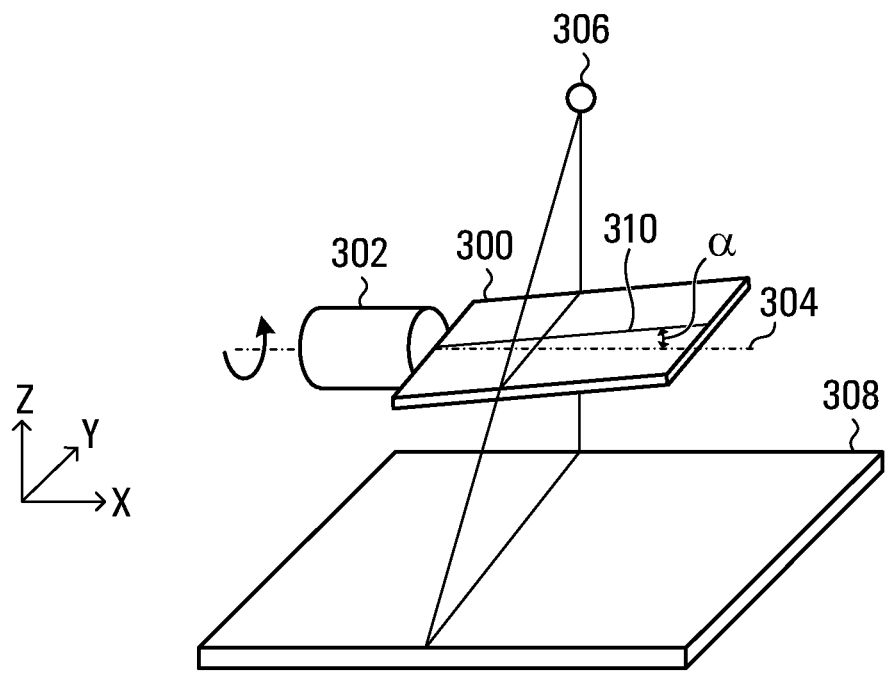
FIG. 3 is a schematic perspective view of a planar object, which is being rotated about a rotation axis and scanned.

At S202, image data representing a CT scan image of a planar object is obtained. The scan image may be obtained in any suitable manner. FIG. 3 schematically illustrates an exemplary scanning process for imaging a planar object 300. The planar object 300 is rotated by a rotator 302 about a rotation axis 304, typically stepped with equal angular steps. Planar object 300 is irradiated with an irradiation beam from a source 306. The irradiation beam can be light such as X-ray. The irradiation beam can also include any electromagnetic beam suitable for imaging a three dimensional (3D) object. The beam may be collimated, or may spread, such as in a fan-beam as depicted in FIG. 3 or in a cone-beam. A detector 308 detects the irradiation transmitted through planar object 300. The surface plane of detector 308 that receives the irradiation is referred to as the detector plane. For example, detector 308 may be a Direct Digital Detector (DDD), an image intensifier, or any detection device sensitive to X-ray or the particular radiation beam used. The detected image signal is converted to image data, which initially represents two-dimensional (2D) images of planar object 300. As the rotator 302, and thus planar object 300, are rotated to different positions, different 2D projection images of the planar object 300 are obtained, such as at different angular steps. These 2D projection images can be used to reconstruct a 3D scan image of the planar object 300 using conventional computed tomography (CT) techniques, as can be understood by those skilled in art. For example, exemplary CT techniques are disclosed in Jiang Hsieh, *Computed Tomography, Principles, Design, Artifacts and Recent Advances*, 2003, Spie Press, Bellingham, Wash. (Referred to herein as "Hsieh"); and Avinash C Kak and Malcolm Slaney, *Principle of Computed Tomographic Imaging*, 1999, IEEE Press (available in electronic copy, referred to herein as "Kak and Slaney").

Planar object 300 has a generally flat surface 310. As depicted, planar object 300 may have another generally flat surface parallel to surface 310. The plane of surface 310 may be referred to as the object plane. Another plane of interest inside object 300, which is identifiable from the image, may also be used as an object plane, as will become apparent. For ease of description, it is assumed below that the plane for surface 310 is the object plane and is referred to as object plane 310. Object plane 310 may intersect rotation axis 304 at an angle of "α". Ideally, object plane 310 should be parallel to rotation axis 304 and α should be zero. In practice, α may not be zero. For the description below, it is assumed that α is non-zero. It is also assumed herein that the angle α does not change during rotation.

Figure 4:
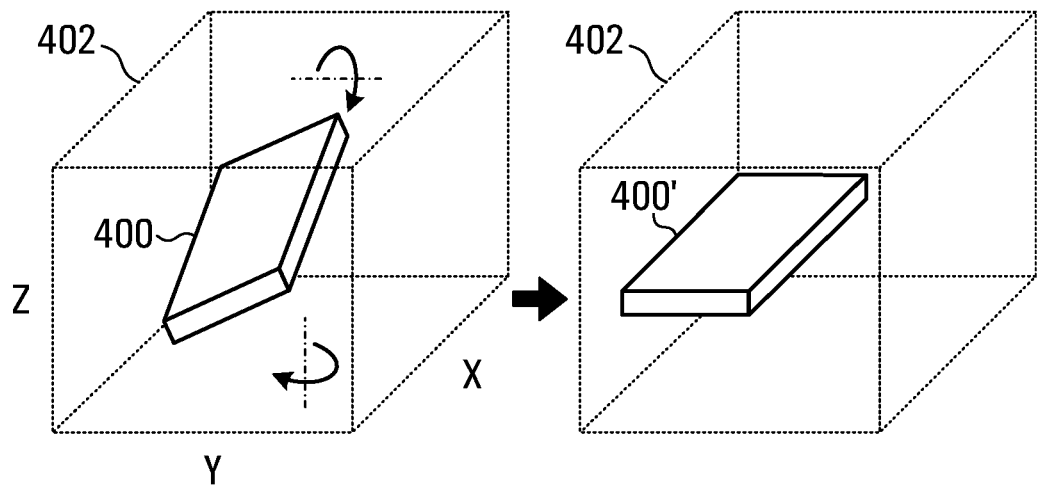
FIG. 4 is a schematic perspective view of a scan image in a reference frame before and after reorientation.

A typical CT scan image 400 of planar object 300 in a reference frame 402 is schematically shown in FIG. 4. A CT scan image may be represented as a matrix of image voxels in a given coordinate system. For illustration purposes, it is assumed herein that a Cartesian coordinate system is used as depicted in the figures. Each voxel of the image has a respective associated intensity. In a black and white CT scan image, the intensity value can represent a gray scale value. To illustrate, it is assumed that the surface plane, or object plane, of the raw object image 400 is not parallel to any of the coordinate axes, which are denoted as x, y, z as shown in FIG. 4. It is typical that the object image 400 is reconstructed within a reference frame with a defined length in each direction, which is often referred to as the reconstruction box or reconstruction volume in the art. As depicted, the x-axis is assumed to be parallel to the rotation axis 304.

It is further assumed that scan image 400 is to be reoriented as scan image 400' to facilitate further processing of the scan image. In the reoriented scan image 400', the image plane that corresponds to the object plane 310 of the planar object 300 is parallel to the x-y plane of the reference frame. In other words, the object lines in different slices are to be aligned.

Figure 2:
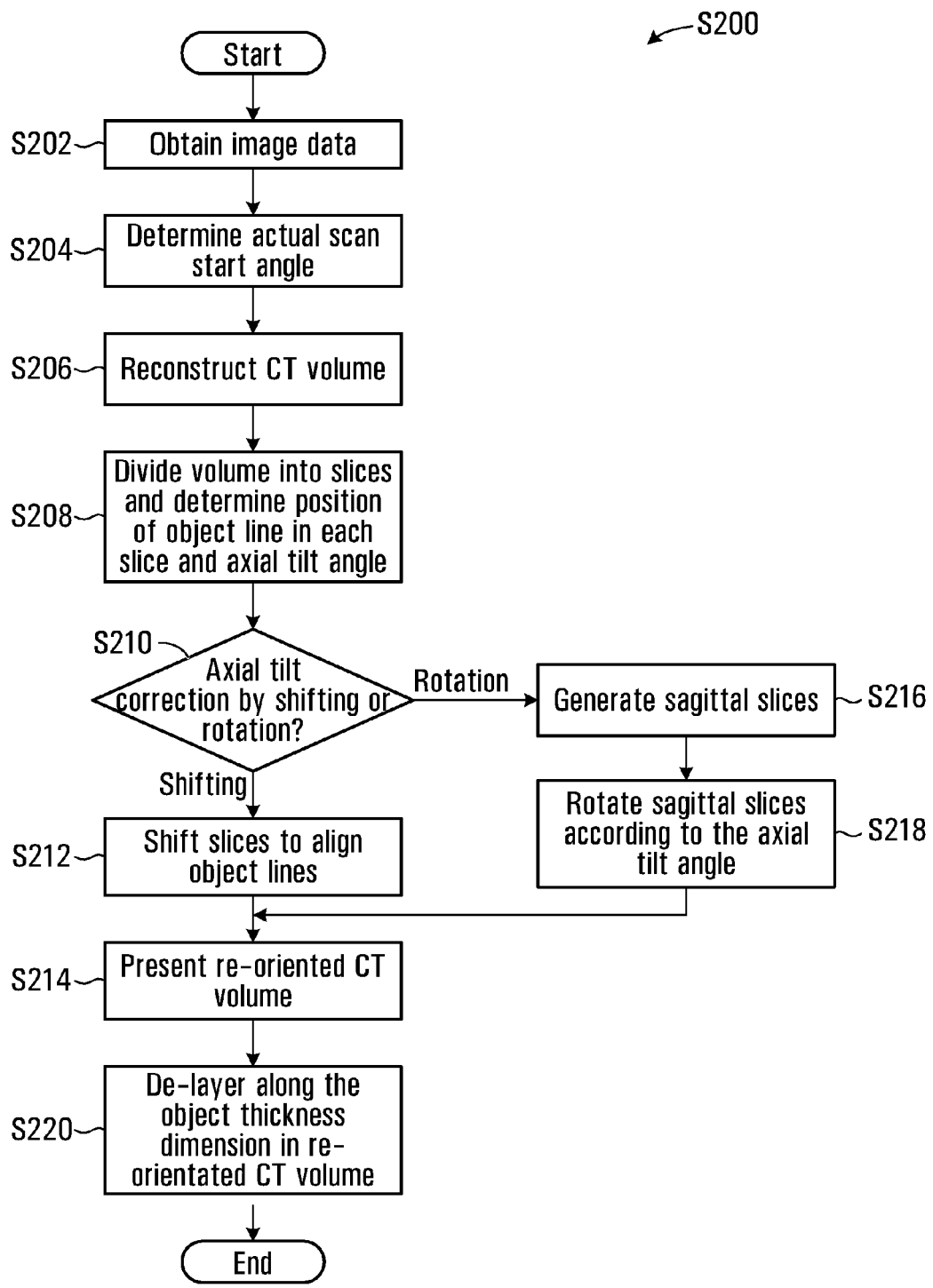
FIG. 2 is a flowchart for an image reorientation process, exemplary of an embodiment of the present invention.

As shown in FIG. 2, the actual start angle of rotation is determined at S204 of process S200.

Figure 5:
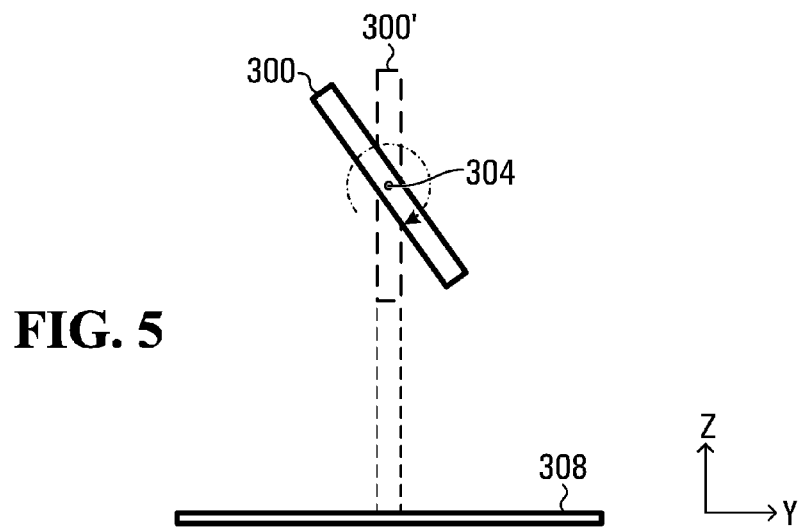
FIG. 5 is an axial elevation view of the planar object of FIG. 3, along the rotation axis.

As depicted in FIG. 5, the actual starting position of planar object 300 is often different from the default starting position 300' assumed in the code.

In practice, the image projection sequence number for the projection image that corresponds to the narrowest projection may be determined based on a sinogram of the image data. Consequently, the actual scanning start angle can be calculated based on this sequence number, the rotation rate of the scan and/or the rate of image acquisition. The scan start angle may be determined by any suitable technique, including a conventional technique. An exemplary technique is disclosed in WO 2008/130325 to Liu et al, published on Oct. 30, 2008 and entitled "Method and Apparatus for Reoriented Reconstruction of Computed Tomography Images of Planar Objects," the entire contents of which are incorporated herein by reference. In this technique, the scan start angle is automatically determined based on the sinogram of the image data. This technique utilizes the fact that, when planar object 300 is rotated to the position shown as 300' in FIG. 5, with object plane 310 perpendicular to the detector plane (or normal to the y-axis), the projected image of object 300 on the detector 308 is narrowest in the y-axis direction; and when the object plane 310 is parallel to the detector plane (or parallel to the y-axis), the projected image is widest in the y-axis direction. Thus, by finding the angular position corresponding to the narrowest point (waist) in the sonogram of the image data, the projection angles (or image sequence number) at which the object plane 310 is parallel or normal to the y-axis can be determined respectively. The actual scan start angle may then be determined.

While FIG. 5 illustrates the projection of object 300' in a parallel-beam configuration, the above principle also applies with a fan-beam configuration because fan-beam projections can be converted to parallel-beam projections, such as with a technique disclosed in Kak and Slaney.

Based on the actual start angle, a CT image volume is formed by reconstructing a set of axial slices from the initial image data, at S206. The reconstruction may be performed using a suitable technique such as a cone-beam reconstruction algorithm, a fan-beam reconstruction algorithm, or another iterative reconstruction algorithm. This reconstruction process is sometimes referred to as "volume reconstruction" in the art.

Figure 6:
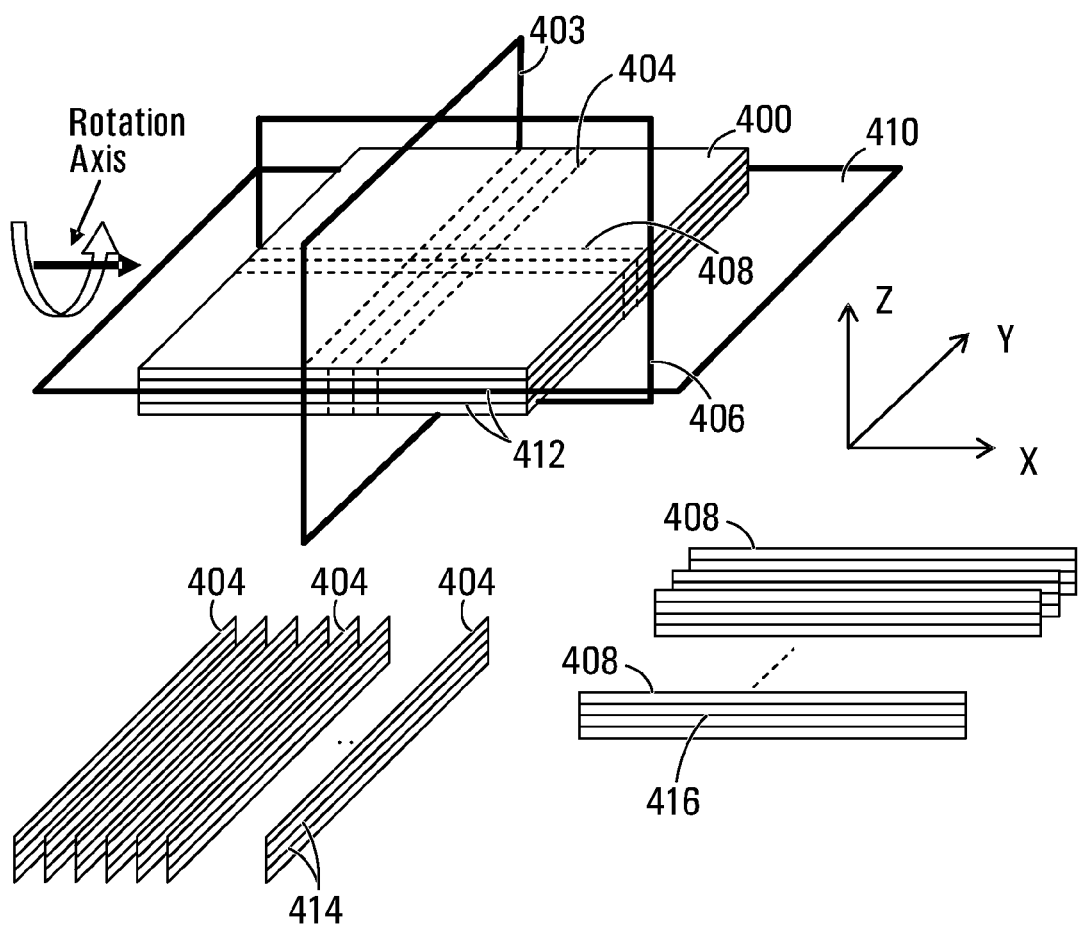
FIG. 6 is a perspective view of the scan image of FIG. 4, and slices of the scan image.

For example, FIG. 6 illustrates the reconstructed scan image 400. Assume that scan image 400 are represented by a matrix of voxels and the intensities of the voxels are expressed as $I(x_i, y_j, z_k)$ in the Cartesian coordinate frame, where/is the intensity of the voxel at $(x_i, y_j, z_k)$, and i, j, k are integer index numbers. In the Cartesian coordinate frame, the x-axis may be oriented so that it is parallel to the rotation axis 304.

For convenience of reference, the x-axis direction is referred to as the axial direction. The plane that is normal to the x-axis, such as plane 403, is referred to as the axial plane. Correspondingly, the image slices that are normal to the x-axis, such as slices 404, are referred to as the axial slices 404. The plane that is normal to the y-axis, such as plane 406, is referred to as the sagittal plane, and correspondingly, the image slices, such as slices 408, that are normal to the y-axis are referred to as the sagittal slices. The plane that is normal to the z-axis, such as plane 410, is referred to as the transversal plane, and correspondingly, the image slices, such as slices 412, that are normal to the x-axis are referred to as the transversal slices.

Thus, each set of image points with $x=x_i$ represents an axial slice 404, which can be denoted as $I_i(y_j, z_k)$, where j and k can be any possible numbers. In the reconstruction process at S206, the axial slices $I_i(y_j, z_k)$ at different $x_i$'s are respectively reconstructed. For easy reference, axial slices 404 are denoted herein by $S_i$, where "i" is an index, and the x-axis coordinate of the slice $S_i$ is denoted $x_i$.

As can be appreciated, 3D scan image 400 may also be divided into a set of sagittal slices 408 or a set of transversal slices 412. The image points in each sagittal slice 408 have the same y-coordinate value. The image points in each transversal slice 412 have the same z-coordinate value. For processing a CT image of a multilayer planar object, the CT volume may be reoriented so that the internal layers in the object image are oriented parallel to the transversal slices 412.

Each axial slice 404 includes lines 414 of image points that have the same z-coordinate value (and thus parallel to the transversal plane 410. One of lines 414 in each slice 404 is an object line which represents the object plane 310. With the axial slices being reconstructed with the actual start angle, object plane 310 is aligned with the y-axis so that the intersect between object plane 310 and axial plane 403 is a line that is parallel to the y-axis.

Each sagittal slice 408 includes lines 416 of image points that have the same z-coordinate value (and thus parallel to the transversal plane 410). In an initial reconstructed sagittal slice 408, object plane 310 is represented by a line (not shown) that is not parallel to the transversal plane 410.

At S208, the positions of the object lines (also referred to as the primary line of the object) in individual axial slices 404 are determined for at least some representative axial slices. Optionally, the position of the object line in each axial slice 404 may be determined. The object lines in different axis slices should correspond to the same object plane such as object plane 310. Optionally, the tilt angle may be determined based on the positions of the object lines in different axial slices 404 at S208, as will be further described below.

Figure 7:
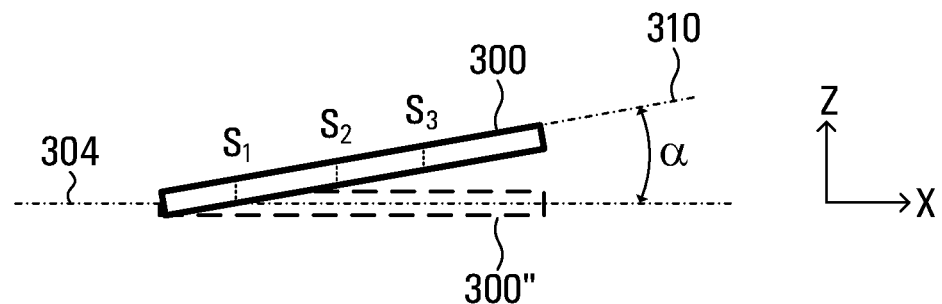
FIG. 7 is a front elevation view of the planar object of FIG. 3.

For instance, the z-coordinate of the object line in each axial slice 404 may be determined. As the object line in an axial slice 404 represents object plane 310, and as the object plane is not parallel to the x-axis (which is parallel to the rotational axis 304), the object lines in different axial slices have different positions (z-coordinate values), as illustrated in FIGS. 7 and 8.

The z-coordinate of the object line in the image slice $S_i$ is denoted as $P_1$, the z-coordinate of the object line for slice $S_2$ as $P_2$, and the z-coordinate of the object line for $S_3$ as $P_3$. When there is a axial tilt, $P_1$, $P_2$, and $P_3$ will have different values, and the positions (z-coordinates) of the object lines in different slices of image 400 will be different, as the object plane 310 is not parallel to the rotation axis 304. The positions or coordinates of the corresponding slices $S_1$, $S_2$, $S_3$ in the planar object 300 are illustrated in FIGS. 7 and 8. FIG. 7 shows the positions of the three slices $S_1$, $S_2$, $S_3$ in the planar object 310, which correspond to the respective axial slices in the scan image 400. As can be seen, when the angle α is non-zero, the positions ($P_1$, $P_2$, $P_3$) of the object plane in different axial slices are different.

Figure 8:
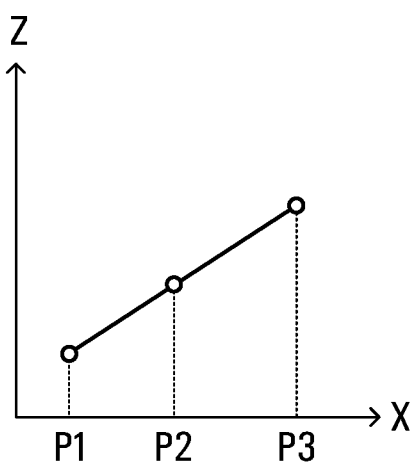
FIG. 8 is a line graph showing the object plane and the relative positions of object slices with different slice index numbers.

The positions of the corresponding object lines in different axial slices 404, in theory, should be substantially aligned along a straight line, as shown in FIG. 8.

The positions of the object lines in the axial slices 404 may be determined based on distribution of line intensities in axial slices 404. For example, the line positions may be conveniently determined from the line intensity distribution for lines 414. The line intensity for each line 414 may be the sum of the intensities for all image points on that line, or another quantity that is reflective of the sum. For example, an average intensity of the image points may be used instead of the sum.

As the object image points will have intensities substantially different from the background image points, which may be reflected as sharp intensity jumps in the scan image or a substantial change in intensity at the boundaries of the object image. Thus, the object line may be determined by assuming that the sharp edge of an intensity jump in the image represents the object line, and the position (z-value) of the edge in each axial slice 404 may be taken as the position of the object line in that slice.

For example, the line intensity distribution curve for a slice $S_i$ may be represented by $H_i(k) = \Sigma I(x_i, y_j, z_k)$, where the sum is over all possible values of index "j" for a given value of k.

Figure 9:
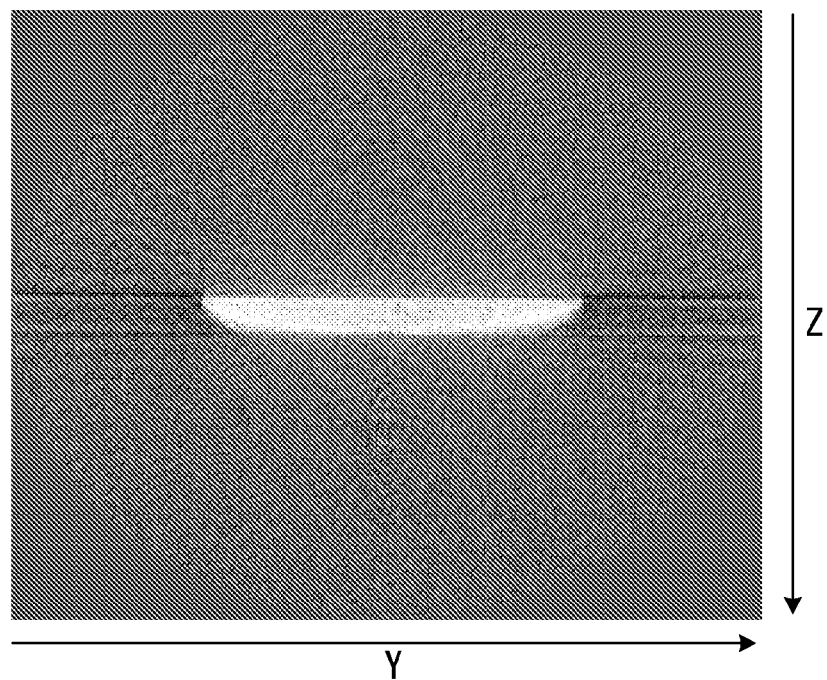
FIG. 9 is a screen snapshot showing a slice of a CT axial slice of a planar object.
Figure 10:
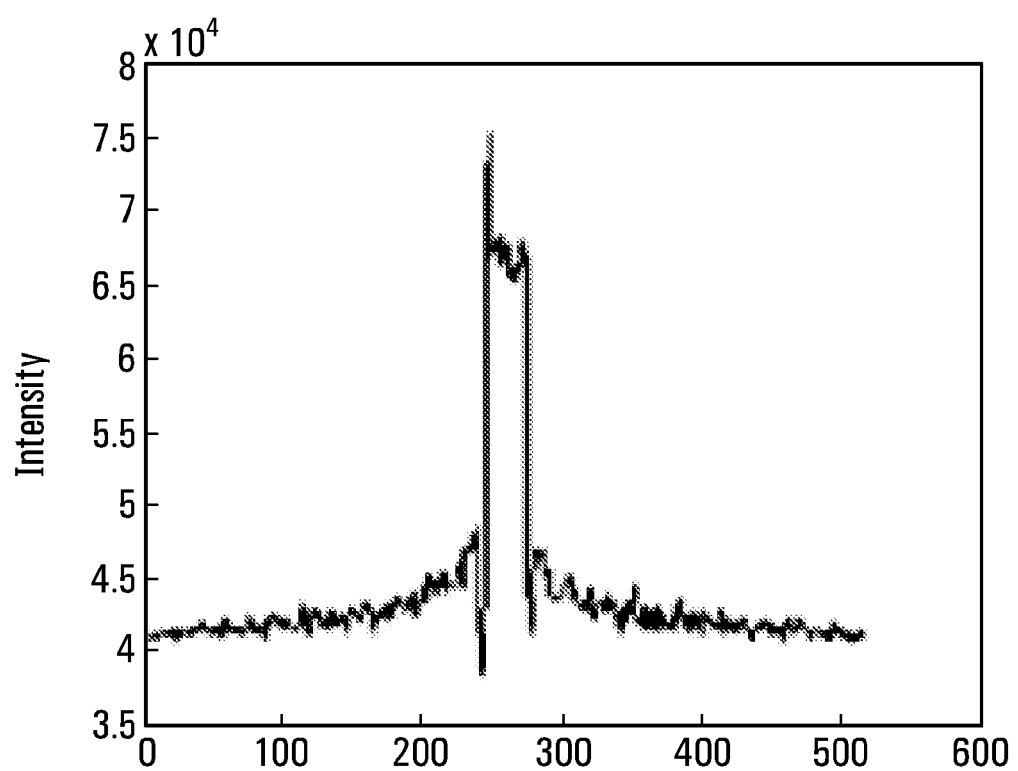
FIG. 10 is a line graph showing the curve of total line intensities in the slice of FIG. 9.

An exemplary scan image and a corresponding line intensity distribution are shown in FIGS. 9 and 10, respectively.

The position of the object edge(s) (represented by the edge of an intensity peak) in each intensity distribution may be determined using any suitable boundary detection technique. For example, the intensity curve may be fit to a step function and the leading edge of the step function may be used as the leading edge of the peak, the trailing edge of the step function may be used as the trailing edge of the peak, and the width of the step function may be used as the width of the peak. Such a technique can be readily implemented by those skilled in the art.

Figure 11:
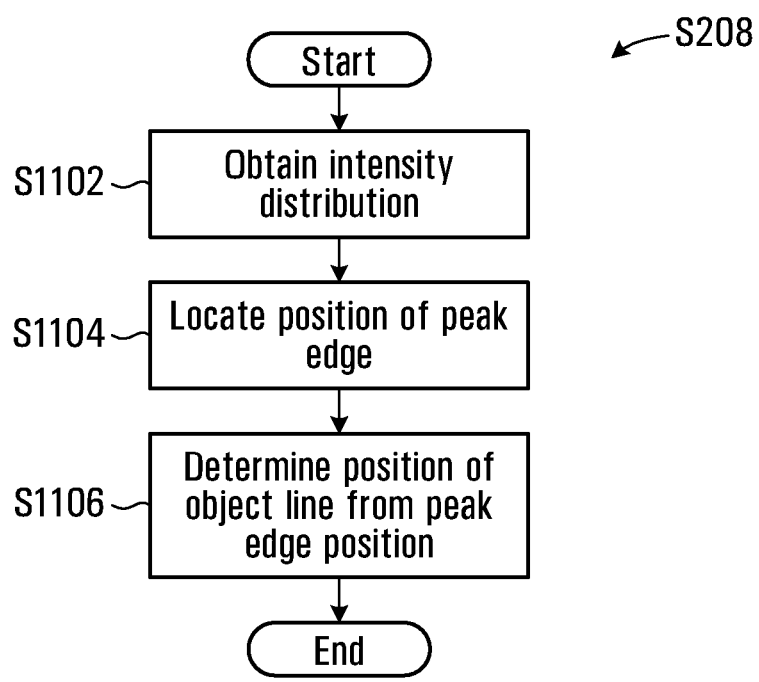
FIG. 11 is a flowchart for a process to shift slices of a scan image based on the curve of total line intensity.

The position (z-coordinate) of the object line in each axial slice 404 may be determined according to the process S208 shown in FIG. 11.

At S1102, an intensity distribution in each axial slice 404 ($S_i$) is obtained as discussed above from the image data.

At S1104, the edge position of the intensity peak in the intensity distribution of each axial slice $S_i$ is located. As used herein, the peak position of the intensity peak may refer to an edge position or a center position of the peak, depending on how the object plane is defined. For example, if a surface of the planar object is defined as the object plane, the location of the leading or trailing edge of the peak may be used as the peak position depending on which edge corresponds to that surface. If the center plane of the object is used as the object plane, the center of the peak may be used as the position of the peak. The peak positions may be determined in a consistent manner for all slices, such as when the slices are to be shifted with reference to a reference slice. However, in some cases, peak positions may be determined in different manners for different slices.

At S1106, the positions ($P_i$) of the object line in the respective axial slices 404 are determined based on the peak positions.

In some cases, the peak positions directly correspond to the positions of the object plane in the respective slices. In other words, the peak position in an axial slice 404 corresponds to the position of the object line in that particular slice.

Figure 12:
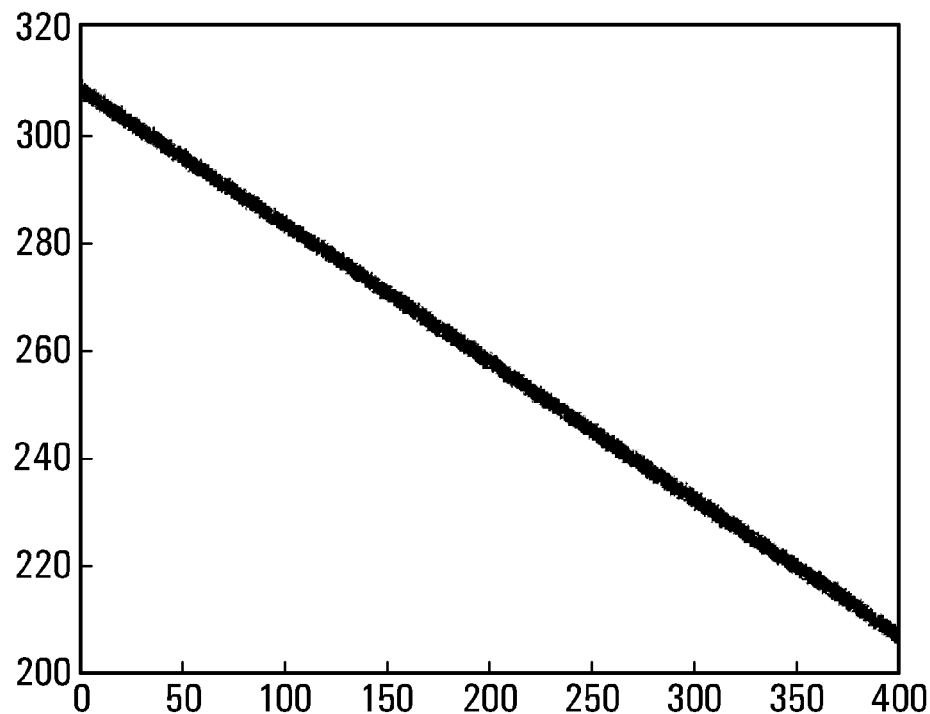
FIG. 12 is a data graph showing the positions of the object plane in different slices of a scan image.

FIG. 12 shows the positions of the object plane in different slices of an exemplary scan image, which were determined according to the above procedure.

In cases such as the one shown in FIG. 12, the peak position $P_i$ for each slice may be used directly as the position of the object plane in the slice (object line).

Alternatively, the positions of the object lines may be calculated based on a function of the peak positions for all slices or a number of neighboring slices. For example, the peak positions from different slices may be fit to a straight line and the resulting line function may be used to calculate the positions of the object lines in the slices. This line function may also be used to extrapolate the object line positions in other slices in the same image. This approach may be applicable to planar objects with surfaces that have patterns such as solder pads, in cases where the edge positions do not form a linear line due to noise or low material density.

Figure 13:
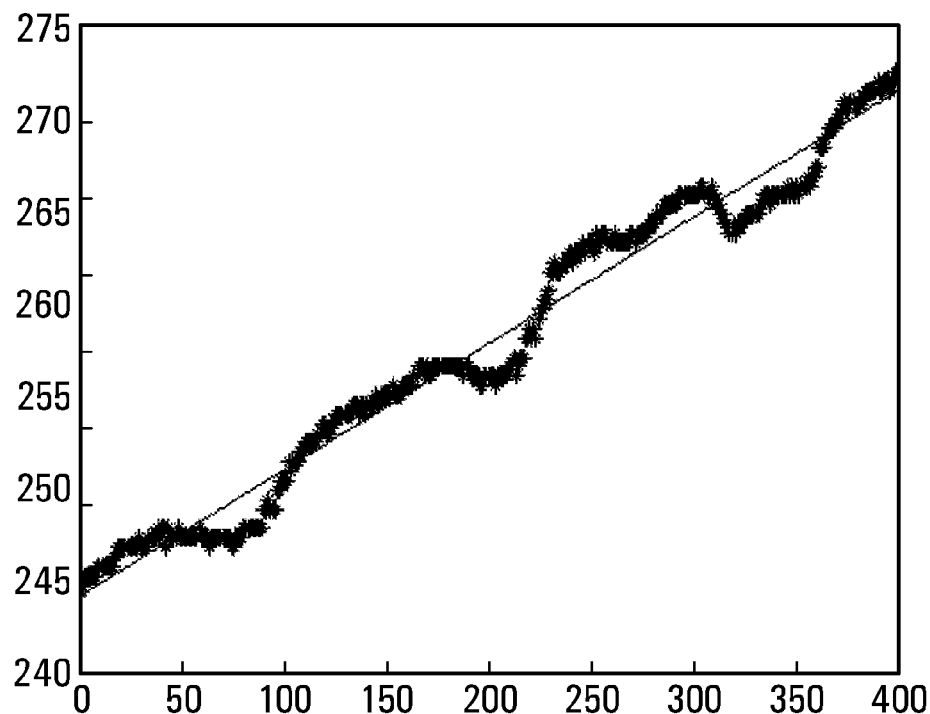
FIG. 13 is a data graph showing the positions of the object plane in different slices of another scan image.

FIG. 13 shows peak positions in difference slices in another example scan image where the peak positions do not form a straight line. Such a result may arise when there are patterns on the surface of the object. In this case, fitting the peak positions (or initial object line positions) to a linear (straight) line can provide an improved result. The tilt angle (α) may be determined based on the fit, such as by calculating the angle between the fitted linear line and the reference axis (rotation axis), or the slope of the linear line. The object line positions and the required shifts of the slices may be calculated based on the slope of the fitted line (or the tilt angle α) and the x coordinates of the respective slices.

As now can be appreciated, to ensure the object line positions are correctly determined, the scan image 400 should be pre-oriented in the reference frame 402 such that the object lines in the slices 404 are substantially parallel to the y-axis (and perpendicular to the z-axis) before the positions of the object lines are determined from the line intensity curve. If the object lines are not substantially parallel to the y-axis, the positions of the object lines determined from the line intensity distribution would be less accurate. Such pre-orientation may be performed using a conventional technique. Generally, such alignment may be obtained by reconstructing the CT volume (image) with the actual scan start angle. A proper correction or reconstruction procedure may be carried out if the object plane 310 is not parallel to the y-axis, such as according to the technique disclosed in Liu.

The tilt angle may be conveniently calculated from the object line positions. For example, the tilt angle may be calculated from the slope of line shown in FIG. 8, 12 or 13.

After the positions of the object lines, and optionally the tilt angle, are determined, image 400 may be reoriented in one of two possible manners, i.e., by shifting or rotation. Thus, a decision is made at S210. The decision may be pre-made based on a default value, or may be interactively made based on a user input. Alternatively, if a decision has already been made, S210 may be omitted and the process proceeds to the default route.

If it is decided that the image is to be reoriented by shifting, the axial slices 404 are shifted in the z-axis direction to align the object lines in the axial slices at S212. That is, in the aligned axial slices, the corresponding object lines are all within the same transversal plane.

Each axial slice 404 may be shifted based on the difference between its object line position and a reference object line position. The reference object line position may be a preselected position or an object line position in a reference axial slice.

For instance, each axial slice 404 may be shifted in a direction parallel to the z-axis (perpendicular to the x-axis), so that the object lines in all axial slices 404 are aligned in a plane parallel to the x-axis, and have the same z-coordinate. Each axial slice 404 may be shifted in the z-direction based on the position of the object line in the axial slice and a reference position. For example, each axial slice 404 may be shifted by an amount of $(P_i-P_0)$, where $P_i$ is the position of the object line and $P_0$ is a reference position. $P_0$ is a constant, which may be zero or equal to the position of the object line in a reference slice. When a slice is shifted, each line (or image points on the line) in the slice is moved by a same amount in the same direction.

An axial slice 404 may be shifted by simply translating the axial slice 404 along the shifting direction with the relative image point positions in the axial slice remain intact. When a reconstruction box is provided, translating a slice will result in some lines of the slice being moved out of the reconstruction box. In this case, the slice may be shifted by moving each line that is about to be shifted out of one side of the box to the other side of the box. For example, when a slice is shifted down by four lines, the four bottom lines may be moved to the top and become the top four lines. Consequently, the number of lines in the box remains constant before and after the shift. Alternatively, lines being shifted out of the box may be simply discarded, and the blank spots resulted from shifting may be filled with default values.

Figure 14:
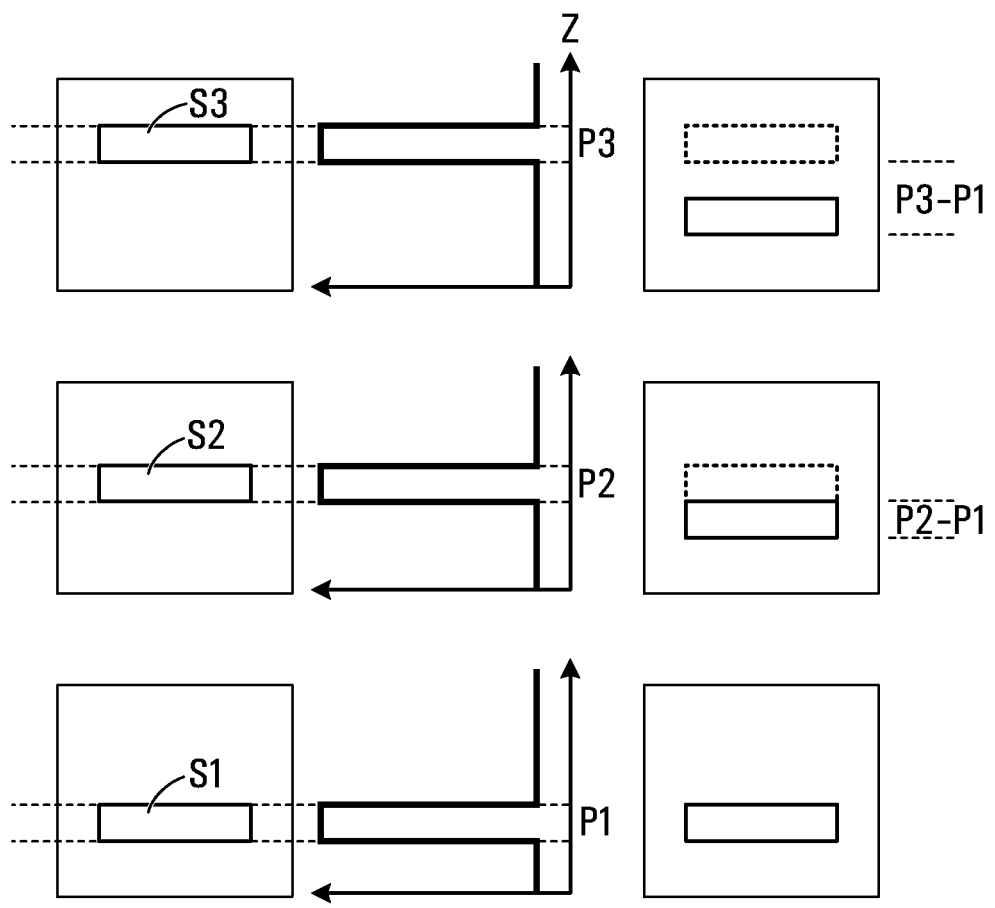
FIG. 14 is a schematic diagram showing the shift of three slices of a scan image, and the corresponding curve of total line intensities.

FIG. 14 illustrates the shifting of three axial slices, $S_1$, $S_2$ and $S_3$, of a scan image, which have respective object line positions $P_1$, $P_2$, and $P_3$. In this example, slice $S_1$ is taken as the reference slice and is not shifted (or shifted by a zero amount). Slice $S_2$ is shifted in a direction parallel to z-axis by $(P_2-P_1)$, and slice $S_3$ is shifted in a direction parallel to z-axis by $P_3-P_1$.

After shifting of the axial slices 404 as described above, the object line in each axial slice has the same position ($P_0$). As can be understood by those skilled in the art, the same result (alignment of the object lines in the same transversal plane) can be achieved by different transformation techniques. For example, the z-coordinate of the object lines in all slices may be adjusted to be a constant, such as zero. Alternatively, the z-coordinates of the object lines may be adjusted to be same as that of a reference slice. The amount of shifting for each slice may also be calculated from the tilt angle if the tilt angle is determined.

In any event, the differences between the z-coordinates of the object plane in different slices are eliminated by the shifting. As a result, the object lines of the axial slices in the reoriented image 400' are all in a transversal plane (object plane) that is parallel to the x-y plane, and to the x-axis.

Figure 15:
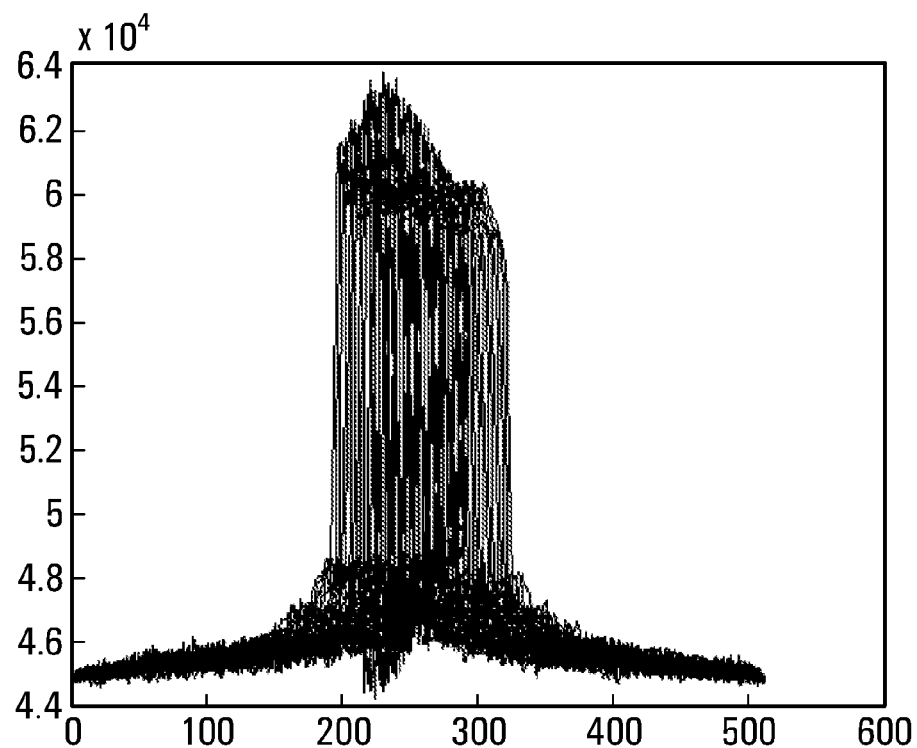
FIGS. 15 and 16 are data graphs showing the superposition of curves of line intensities for different slices in the same scan image before and after reorientation respectively.
Figure 16:
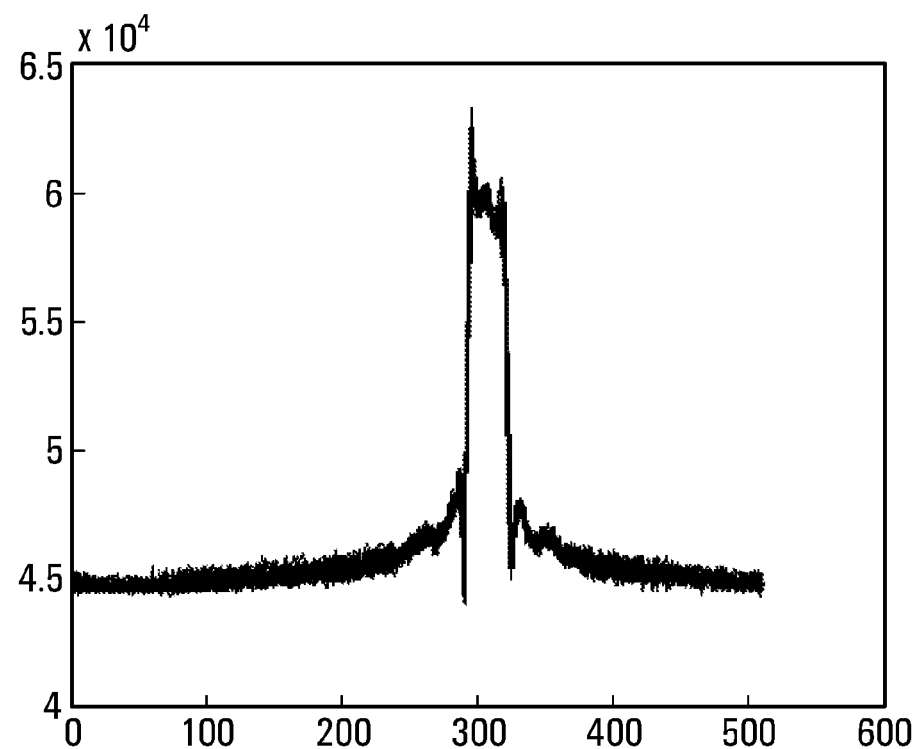

FIGS. 15 and 16 illustrate the effects of slice shifting. FIG. 15 shows the superposition of the intensity distributions for all slices in a scan image. Due to tilt misalignment, the peaks are spread out in FIG. 15 indicating that the object lines in different slices have different positions. FIG. 16 shows the intensity distributions for the reoriented scan image. As can be seen, the peaks have substantially the same position in all slices, indicating that the object plane is substantially parallel to the reference axis and the object lines in the slices have substantially the same position.

A representation of the resulting reoriented 3D image may be presented to a user at S214, such as through output 108.

Figure 17:
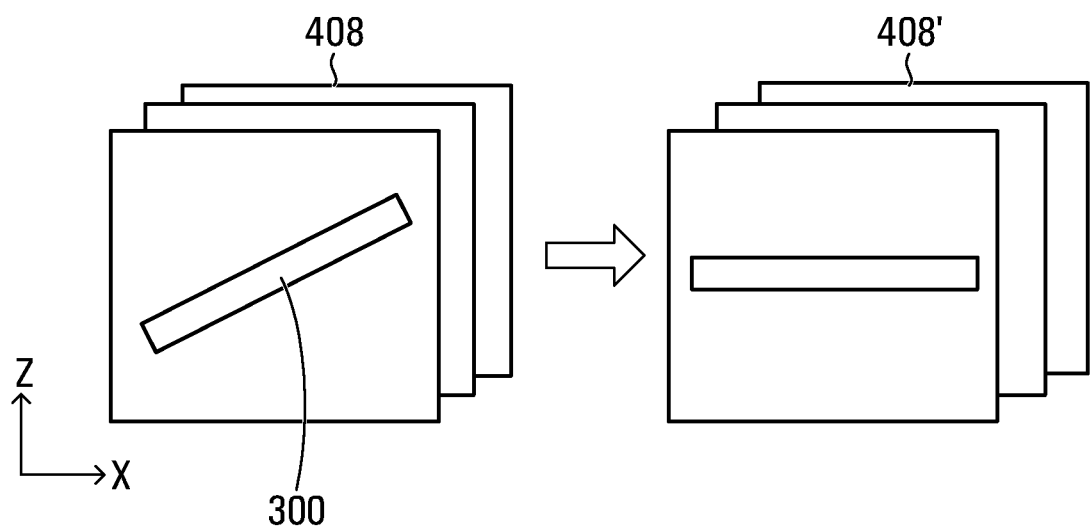
FIG. 17 is a schematic diagram of sagittal slices before and after axial tilt correction.

If the decision at S210 is to reorient image 400 by rotation, a set of sagittal slices 408 may be generated at S216, which are then rotated, such as by the tilt angle at S218 to produce reoriented sagittal slices 408', as illustrated in FIG. 17. In the reoriented 3D image formed by sagittal slices 408', the object lines in all axial slices are also aligned.

The sagittal slices 408 may be readily generated from image 400 by a person skilled in the art. Different sagittal slices 408 should be rotated about the same axis for the same amount to preserve the integrity of the resulting image, and to avoid distortion. The axis of rotation is normal to sagittal plane 406 but may be located at any selected point in sagittal plane. For example, y-axis may be used conveniently used as the axis of rotation. The amount of rotation should be selected such that in the resulting reoriented sagittal slices 408', the object lines are parallel to the x-axis. Conveniently, the tilt angle determined at S208 may be used to determine the amount of rotation.

After rotation, the re-oriented CT image may be presented to the user at S214.

Figure 18:
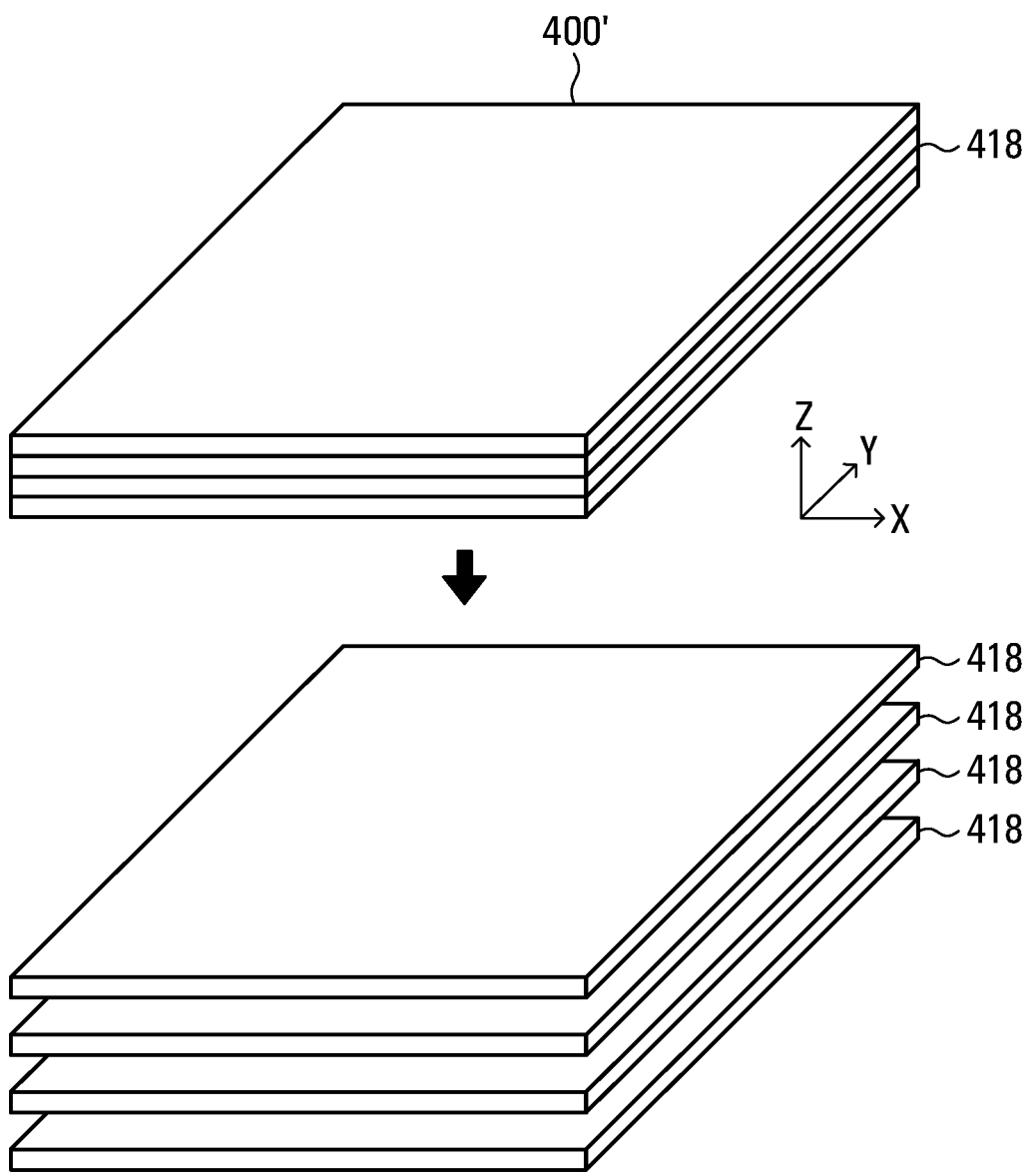
FIG. 18 is a perspective view of the reoriented scan image of FIG. 4, and its image layers.

For example, a visual depiction of the reoriented 3D image may be displayed on display 114, as illustrated in FIG. 18. In FIG. 18, scan image 400' has been reoriented such that the object plane 310 is now parallel to the x-y plane (and perpendicular to z-axis). As a result, the scan image 400' can be de-layered into layers 418 that are parallel to the x-y plane, where the layers 418 are also parallel to the object layers in the object image.

The reoriented 3D image 400' may be further processed or stored before or after being presented to the user. Segments or portions of the 3D image may be separately extracted and presented to the user. The 3D image may be presented in a 2D representation.

Figure 19:
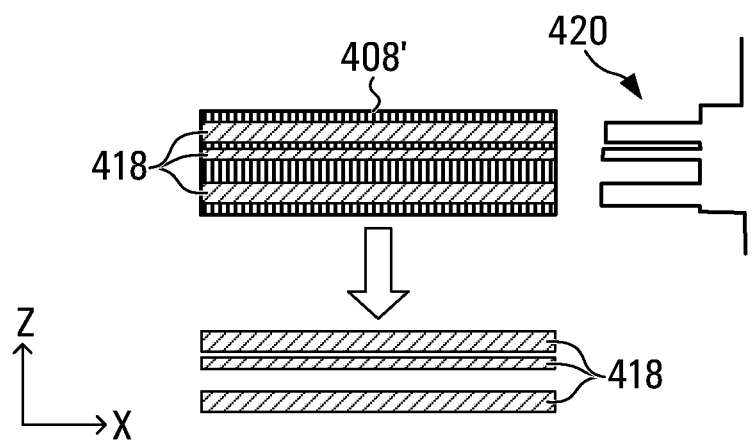
FIG. 19 is a schematic plan view of a slice in the reoriented scan image, and its line intensity distribution.

For example, image 400' may be de-layered at S220 as illustrated in FIG. 19, where layers 418 represent different physical layers in the imaged object, and the intensity distribution curve 420 reflects the intensity distribution for different layers 418.

In the representation of the resulting re-oriented 3D scan image 400', the layers 418 corresponding to physical layers of object 300 may be obtained by digitally cutting 3D scan image 400' perpendicular to the z-axis, at the position where a layer is positioned. Layers 418 may be cut based on the sharp edges in the intensity distribution curve 420, which may indicate the positions of the physical layers. In some applications, the positions (and widths) of internal layers of an object can be automatically determined from the intensity distribution 420. Images of the internal layers can thus be automatically obtained by extracting the scan image data at the determined layer positions. Image layers 418 may be separately processed and analyzed.

Layers 418 may be convenient to process and analyze, and the object image 400' can be more conveniently processed or analyzed than image 400.

It can now be understood that it is not necessary to use the image data in a given slice to determine the amount of shifting that is needed to correct for the misalignment with the rotation axis, nor is it necessary to use the image data in every slice to determine the angle α. For example, the amount of misalignment of an axial slice due to axial tilt may be determined based on extrapolation from other axial slices. The axial tilt angle α may be estimated from a subset of the slices. For instance, the angle α may be determined from slices that have only even index numbers or odd index numbers, or are known to be representative of the other omitted slices. In a simplistic approach in an ideal case, a tilt angle may be determined from two axial slices.

The planar object imaged may be any planar object that is to be processed or analyzed. For example, the planar object may be an integrated circuit (IC) chip, stacked IC chips, or Low Temperature Co-Fired Ceramics (LTCC).

Process S200 may be completely automated and does not require human intervention. The results do not rely on user experience or judgment. Thus, consistent and reliable results can be achieved. With the reoriented scan image, further processing and analysis may be more convenient, efficient, and accurate.

Process S200 may be performed relatively quickly and may not require extensive computing resources. There is also no need to measure additional data or to make any manual measurement or adjustment to the image. Since the object surface is aligned parallel to the reference axis, it is more convenient to reconstruction the object image with a higher resolution in the direction that is perpendicular to the object plane.

Other features, benefits and advantages of the present invention not expressly mentioned above can be understood from this description and the drawings by those skilled in the art.

Although only exemplary embodiments of this invention have been described above, those skilled in the art will readily appreciate that many modifications are possible therein without materially departing from the novel teachings and advantages of this invention.

The invention, rather, is intended to encompass all such modification within its scope, as defined by the claims.

What is claimed is:

1. A computer-implemented process of reorienting a three-dimensional (3D) scan image of an object, said object having a generally flat surface, said image being constructed from image data obtained during rotation of said object about a rotation axis, said rotation axis intersecting the plane of said flat surface at an angle, said process comprising:
    obtaining two-dimensional (2D) axial slices of said scan image, each representing a slice of said object that is perpendicular to said rotation axis and comprising a line representing said flat surface of said object;
    shifting said 2D axial slices relative to each other to align lines representing said flat surface in different ones of said 2D axial slices;
    forming a reoriented 3D image comprising said 2D axial slices with lines representing said flat surface aligned by said shifting;
    presenting a representation of said reoriented 3D image to a user; and
    calculating said angle, from said lines representing said flat surface in different ones of said 2D axial slices;
    wherein said calculating comprises fitting said positions of said lines to a linear line and calculating an angle between said linear line and said rotation axis.

2. The process of claim 1, wherein positions of said lines in different 2D axial slices are determined based on distribution of line intensities in said 2D axial slices.

3. The process of claim 2, wherein said positions of said lines are determined from peak positions in line intensity distribution curves for respective 2D axial slices.

4. The process of claim 3, wherein the peak position of a peak is the position of an edge of said peak.

5. The process of claim 3, wherein the peak position of a peak is the position of the center of said peak.

6. The process of claim 1, wherein said scan image is a computed tomography image.

7. The process of claim 1, wherein said presenting comprises storing said reoriented image in a computer readable medium.

8. The process of claim 1, wherein said presenting comprises presenting a visual depiction of said reoriented image.

9. The process of claim 8, wherein said visual depiction comprises a depiction of a layer of said reoriented image, said layer being perpendicular to said 2D axial slices.

10. A computer comprising a processor and a memory readable by said processor, said memory storing thereon computer executable code for reorienting a three-dimensional (3D) scan image of an object, said object having a generally flat surface, said image being constructed from image data obtained during rotation of said object about a rotation axis, said rotation axis intersecting the plane of said flat surface at an angle, said code when executed by said processor causes said computer to:
    obtain two dimensional (2D) axial slices of said scan image, each representing a 2D slice of said object that is perpendicular to said rotation axis and comprising a line representing said flat surface of said object;
    shift said axial 2D axial slices relative to each other to align lines representing said flat surface in different ones of said 2D axial slices;
    form a reoriented 3D image comprising said 2D axial slices with lines representing said flat surface aligned by shifting;
    present a representation of said reoriented 3D image to a user; and
    calculate said angle, from said lines representing said flat surface in different ones of said 2D axial slices;
    wherein said angle is calculated by fitting said positions of said lines to a linear line and calculating an angle between said linear line and said rotation axis.

11. The computer of claim 10, wherein positions of said lines in different 2D axial slices are determined based on distribution of line intensities in said axial slices.

12. The computer of claim 11, wherein said positions of said lines are determined from peak positions in line intensity distribution curves for respective 2D axial slices.

13. The computer of claim 12, wherein the peak position of a peak is the position of an edge of said peak.

14. The computer of claim 12, wherein the peak position of a peak is the position of the center of said peak.

15. The computer of claim 10, wherein said scan image is a computed tomography image.

16. The computer of claim 10, wherein said presenting comprises storing said reoriented image in a computer readable medium.

17. The computer of claim 10, wherein said presenting comprises presenting a visual depiction of said reoriented image.

18. The computer of claim 17, wherein said visual depiction comprises a depiction of a layer of said reoriented image, said layer being perpendicular to said 2D axial slices.

19. A non-transitory computer readable medium storing thereon computer executable code when executed by a computer causing said computer to perform the process of claim 1.

20. A computer-implemented process of reorienting a three-dimensional (3D) scan image of an object, said object having a generally flat surface, said image being constructed from image data obtained during rotation of said object about a rotation axis, said rotation axis intersecting the plane of said flat surface at an angle, said process comprising:
    obtaining two-dimensional (2D) axial slices of said scan image, each representing a slice of said object that is perpendicular to said rotation axis and comprising a line representing said flat surface of said object;

determining said angle from positions of lines representing said flat surface in different ones of said 2D axial slices;

obtaining two-dimensional (2D) sagittal slices of said scan image, each representing a slice of said object that is perpendicular to said (2D) axial slices of said scan image;

rotating said 2D sagittal slices by said angle to align lines representing said flat surface in different ones of said 2D axial slices;

forming a reoriented 3D image from said 2D sagittal slices as rotated by said rotating, with lines representing said flat surface in different 2D axial slices in said reoriented 3D image aligned; and presenting a representation of said reoriented 3D image to a user;

wherein said determining comprises calculating said angle, by fitting said positions of said lines to a linear line and calculating an angle between said linear line and said rotation axis.

21. The process of claim 20, wherein said positions of said lines in different 2D axial slices are determined based on distribution of line intensities in said 2D axial slices.

22. The process of claim 20, wherein said positions of said lines are determined from peak positions in line intensity distribution curves for respective 2D axial slices.

23. A computer comprising a processor and a memory readable by said processor, said memory storing thereon computer executable code for reorienting a three-dimensional (3D) scan image of an object, said object having a generally flat surface, said image being constructed from image data obtained during rotation of said object about a rotation axis, said rotation axis intersecting the plane of said flat surface at an angle, said code when executed by said processor causes said computer to:

obtain two-dimensional (2D) axial slices of said scan image, each representing a slice of said object that is perpendicular to said rotation axis and comprising a line representing said flat surface of said object;

determine said angle from positions of lines representing said flat surface in different ones of said 2D axial slices;

obtaining two-dimensional (2D) sagittal slices of said scan image, each representing a slice of said object that is perpendicular to said (2D) axial slices of said scan image;

rotate said 2D sagittal slices by said angle form a reoriented 3D image from said 2D sagittal slices as rotated by said rotating, with lines representing said flat surface in different 2D axial slices in said reoriented 3D image aligned;

present a representation of said reoriented 3D image to a user; and calculate said angle, from said lines representing said flat surface in different ones of said 2D axial slices;

wherein said calculating comprises fitting said positions of said lines to a linear line and calculating an angle between said linear line and said rotation axis.

24. The process of claim 1, wherein said rotation of said object about said rotation axis begins at a scan start angle formed by said line representing said flat surface and one of the horizontal or vertical.

25. The computer of claim 10, wherein said rotation of said object about said rotation axis begins at a scan start defined by said line representing said flat surface and one of the horizontal or vertical.

26. A computer-implemented process of reorienting a three-dimensional (3D) scan image of an object, said object having a generally flat surface, said image being constructed from image data obtained during rotation of said object about a rotation axis, said rotation axis intersecting the plane of said flat surface at an angle, said process comprising:

obtaining two-dimensional (2D) axial slices of said scan image, each representing a slice of said object that is perpendicular to said rotation axis and comprising a line representing said flat surface of said object;

shifting said 2D axial slices relative to each other to align lines representing said flat surface in different ones of said 2D axial slices;

forming a reoriented 3D image comprising said 2D axial slices with lines representing said flat surface aligned by said shifting; and presenting a representation of said reoriented 3D image to a user;

wherein said image data is obtained from an image signal detected by a detector having a detector plane, and said scan image is initially registered in a Cartesian coordinate system such that a first coordinate axis is parallel to said rotation axis and a second coordinate axis is parallel to said detector plane;

wherein said shifting comprises shifting said 2D axial slices in a direction parallel to a third coordinate axis such that said lines representing said flat surface have the same coordinate along said third coordinate axis after said shifting.

27. A computer comprising a processor and a memory readable by said processor, said memory storing thereon computer executable code for reorienting a three-dimensional (3D) scan image of an object, said object having a generally flat surface, said image being constructed from image data obtained during rotation of said object about a rotation axis, said rotation axis intersecting the plane of said flat surface at an angle, said code when executed by said processor causes said computer to:

obtain two dimensional (2D) axial slices of said scan image, each representing a 2D slice of said object that is perpendicular to said rotation axis and comprising a line representing said flat surface of said object;

shift said axial 2D axial slices relative to each other to align lines representing said flat surface in different ones of said 2D axial slices;

form a reoriented 3D image comprising said 2D axial slices with lines representing said flat surface aligned by shifting; and present a representation of said reoriented 3D image to a user;

wherein said image data is obtained from an image signal detected by a detector having a detector plane, said scan image is initially registered in a Cartesian coordinate system such that a first coordinate axis is parallel to said rotation axis and a second coordinate axis is parallel to said detector plane;

wherein said shifting comprises shifting said 2D axial slices in a direction parallel to a third coordinate axis such that said lines representing said flat surface are equal distance to said first coordinate axis after said shifting.

* * * * *